United States Patent [19] [11] 3,951,591
Birke et al. [45] Apr. 20, 1976

[54] PROCESS FOR DYEING SYNTHETIC FIBER MATERIALS

[75] Inventors: Walter Birke; Rudolf Schickfluss; Franz Schon, all of Frankfurt am Main, Germany

[73] Assignee: Hoechst Aktiengesellschaft, Frankfurt am Main, Germany

[22] Filed: Oct. 23, 1973

[21] Appl. No.: 408,643

[30] Foreign Application Priority Data
Oct. 24, 1972  Germany............................ 2252123

[52] U.S. Cl. ....................................... 8/41 A; 8/1 E; 8/41 R; 8/41 B; 8/41 C; 8/41 D; 8/50; 8/94 A; 260/205; 260/206; 260/207.5
[51] Int. Cl.² ...................... D06P 1/04; C09B 43/00
[58] Field of Search ............:....... 8/41 A, 41 B, 41 C, 8/41 D, 173, 174, 41 R, 50, 94; 260/205, 206, 207.5

[56] References Cited
UNITED STATES PATENTS

| | | | |
|---|---|---|---|
| 1,738,978 | 11/1929 | Whitehead........................... | 8/173 X |
| 3,523,749 | 8/1970 | Kenneth et al. ...................... | 8/163 X |
| 3,663,161 | 5/1972 | Litzler et al. ......................... | 8/174 |
| 3,684,431 | 8/1972 | Bishof et al............................ | 8/137 |
| 3,738,803 | 6/1973 | Blanc et al..........................:.. | 8/174 X |
| 3,814,579 | 6/1974 | Birke et al. ........................... | 8/163 X |

FOREIGN PATENTS OR APPLICATIONS
1,966,124  9/1971  Germany

OTHER PUBLICATIONS
W. F. Beech: Fibre–Reactive Dyes; Lugos Press Limited, 1970, p. 221.

*Primary Examiner*—Leland A. Sebastian
*Assistant Examiner*—David Leland
*Attorney, Agent, or Firm*—Henry W. Koster

[57] ABSTRACT
A process for the continuous dyeing of synthetic fibrous materials from organic solvents, which comprises impregnating the said fibrous materials with organic dyebaths containing at least one dyestuff of the formula (1)

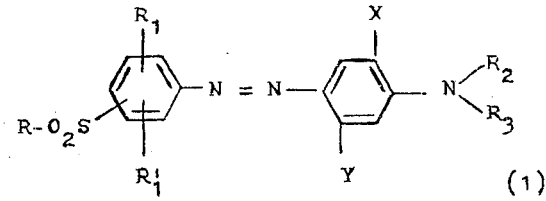

in which R represents a secondary or tertiary amino group of the formula (2)

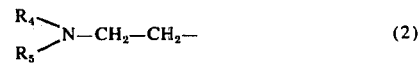

in which $R_4$, $R_5$ each represents, straight chain or branched alkyl, hydroxyalkyl, lower alkyl —COO— lower alkylene, and $R_4$ additionally represents hydrogen lower alkyl —o— lower alkylene, or $R_4$ and $R_5$ represent together with the nitrogen atom the heterocyclic ring
$R_1$ and $R_1'$ each represents hydrogen, chlorine, bromine, lower alkyl, lower alkoxy, nitro or —SO$_2$— lower alkyl, $R_2$ and $R_3$ each represents hydrogen, lower alkyl, cyano-lower alkylene, hydroxy- lower alkylene, lower alkylene
lower alkyl, lower alkylene
lower alkyl,
lower alkylene-phenyl or phenyl, X represents hydrogen, chlorine, bromine, lower alkyl or lower alkoxy, Y represents hydrogen, chlorine, bromine, lower alkyl, lower alkoxy or acylamino, and subsequently fixing the applied dyestuffs by a heat treatment.

7 Claims, No Drawings

PROCESS FOR DYEING SYNTHETIC FIBER MATERIALS

The present invention relates to a process for the dyeing of synthetic fibrous material from organic solvents. It has been found that valuable, fast dyeings can be produced from organic solvents on synthetic fibrous materials by a continuous dyeing process, said fibrous materials being impregnated with organic dyeing liquors containing dyestuffs of the general formula (1)

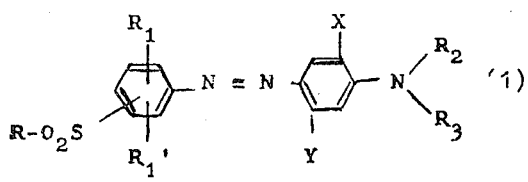

in which R represents a secondary or tertiary amino group of the formula (2)

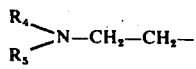

in which $R_4$ and $R_5$ — independently of one another — each represents hydrogen atoms or straight-chain or branched alkyl radicals having from 1 to about 12, preferably from 4 to 10 carbon atoms, being optionally substituted by a hydroxy group, an alkoxy group with preferably 1 – 4 carbon atoms or by an acyloxy group, such as, for example, an acetyloxy group or a benzoyloxy group, or $R_4$ and $R_5$ represent alkylene groups which form a heterocyclic 5- or 6- membered ring jointly with the nitrogen atoms, with the proviso that $R_4$ and $R_5$ do not simultaneously represent hydrogen atoms.

$R_1$ and $R_1'$ represent - independently of one another — hydrogen atoms, chlorine atoms and/or bromine atoms, and/or alkyl groups having preferably from 1 – 4 carbon atoms, alkoxy groups with preferably 1 to 4 carbon atoms, nitro groups and/or sulfonalkyl groups having, preferably, from 1 – 4 carbon atoms, $R_2$ and $R_3$ represent - independent of one another - hydrogen atoms, alkyl groups, oxalkyl groups, cyanalkyl groups, alkoxyalkyl groups, alkylcarbonyloxalkyl groups, alkoxycarbonylalkyl groups, alkoxycarbonyloxyalkyl groups, phenyl groups or phenylalkyl groups, each "alkyl" containing preferably from 1–4 carbon atoms, X represents a hydrogen atom, a chlorine atom or a bromine atom or an alkyl or alkoxy group having — each — preferably from 1 – 4 carbon atoms, and Y represents a hydrogen atom, a chlorine atom or a bromine atom, or an alkyl or alkoxy group having, each, preferably from 1 – 4 carbon atoms, or an acylamino group, such as, for example, an alkylcarbonylamino group with 1 – 4 carbon atoms or the benzoylamino group, the alkyl groups and the alkoxy groups for $R_1$, $R_1'$, $R_2$, $R_3$, X and Y may be substituted, for example, by alkoxy groups having from 1–4 carbon atoms, by acyloxy groups, such as acetyloxy groups or benzoyloxy groups, or by halogen atoms, such as chlorine or bromine atoms, and the dyestuffs being subsequently fixed by means of a heat treatment.

Preference is given to the use of dyestuffs having the general formula (5)

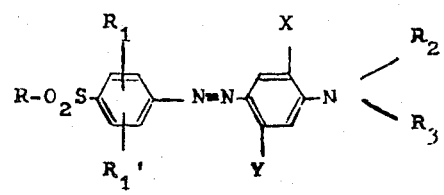

in which

R, $R_1$, $R_1'$, $R_2$, $R_3$, X and Y are defined as above.

Particularly favored is the use of dyestuffs having the general formula (6)

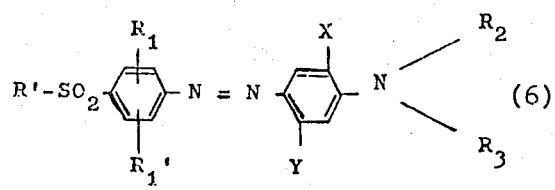

in which $R_1$, $R_1'$, $R_2$, $R_3$, X and Y are defined as above.

R' represents a tertiary amino group of the formula (7)

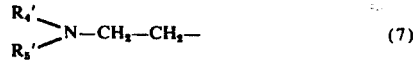

in which $R_4'$ and $R_5'$ — independently of one another - represent straight-chain alkyl radicals having from 1 – 12 carbon atoms.

The application of dyestuffs according to the invention from organic solvents on synthetic fiber materials brings forth dyeings which excel by their high dyestuff yield, very good build-up, and by their excellent fastness properties, especially good fastness to thermofixing, washing, rubbing and light. A further advantage of the dyestuffs applied according to the process of the invention is their high degree of solubility in organic solvents, such as for example, alcohols and especially halogenated hydrocarbons, optionally allowing for dyeing also without solubilizers.

Convenient synthetic fiber materials are those of high molecular-weight polyamides, polyolefins, polyacrylonitriles, moreover polyurethanes, polyvinyl chlorides, polyvinyl acetates, as well as cellulose-2 ½ acetate and cellulose-triacetate, but especially those of high-molecular-weight polyesters, such as polyethylene terephthalate. Said textile materials may also be used in blends to each other or blended to natural fibers, such as cellulose fibers or wool.

The fibrous materials may be present in all processing stages being approciate for a continuous operation, such as tow, top, threads, yarns, woven or knit fabrics, jerseys or "non-wovens".

As organic solvents there are used for the present process those having boiling points not exceeding 150°C under normal conditions, for example aliphatic hydrocarbons, e.g. the special boiling point spirit (cuts) (according to German Industrial Standards DIN 51631/I. 59), aliphatic halogenated hydrocarbons, such as methylene chloride, dichloroethane, trichloroethane, tetrachloroethane, dichlorofluoromethane, dichloretetrafluoroethane, or octafluorocyclolbutane, aromatic hydrocarbons, e.g. toluene and xylene and aromatic halogenated hydrocarbons, such as chlorobenzene and fluorobenzene. Particularly well suited are trichlorofluoromethane, 1,2,2-trichloro-1,1,2-trifluoro-ethane, tetrachloroethylene, trichloroethylene, and 1,1,1-trichloroethane.)

Further convenient solvents are, e.g., alcohols, preferably aliphatic alcohols having up to 4 carbon atoms. Mixtures of various solvents proved to be suitable, especially, for instance, mixtures of halogenated, aliphatic hydrocarbons and aliphatic alcohols.

For preparing the padding liquor, the dyestuffs are dissolved in the solvent respectively in the mixture of solvents while stirring, and optionally while heating. The dyestuffs may be used in various forms, for example free of standardizing agents, as a concentrated solution in a solvent or in a mixture of solvents used according to the invention or as a composition using adjuvants soluble in solvents, such as oxalkylation products of fatty alcohols, alkylene phenols, fatty acids and amides of fatty acids.

Padding is the most usefull application for the dyestuff solutions, but it is possible as well to apply same by other impregnating methods such as spraying, slop padding, or immersing.

Impregnating is carried out preferably at room temperature. It is, however, possible as well to operate at lower or higher temperatures.

The fibrous material treated with the dye liquor is dried preferably before fixing the dyestuff, a procedure which may be realized for example by hot air, suctioning an inert gas (such as nitrogen) or air through it or by applying superheated vapors such as, for example, steam or solvent vapor, resp. by vacuum operating. Subsequently, the dyestuffs are fixed by applying elevated temperatures, such as hot air, dry heat, steam or solvent vapor.

The fixation temperatures depend on the fibres, ranging for padding treatments from 100° to 240°C. The heat treatment may be carried through in superheated steam or in organic solvent vapors. The fixation may as well be executed with the aid of molten metals, paraffins, waxes, oxalkylation products of alcohols or fatty acids or in eutectic mixtures of salts, i.e. according to the so-called "Thermosol" - process.

It is also possible to pack drying and heat procedures in one single operation.

The solvent vapors which escape while drying or fixing are generally recovered in suitable devices.

The recovered solvents may then be used again for the above described dyeing process.

After fixation of the dyestuffs, the unfixed dyestuff portion — if any — is eliminated by suitable aftertreatments which may lead to better fastness properties. Preferably, this secondary treatment is carried out in the very organic solvent used for the dyeing process, but it is also possible to operate in other organic solvents or in aqueous liquors in well-known manner. The new dyestuffs of the formula (1) may be prepared by having react diazocomponents of the formula (3)

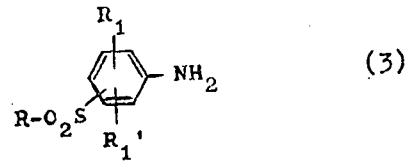

in which
R represents a vinyl group and $R_1$ and $R_1'$ are defined as above with primary or secondary aliphatic amines, such as alcoholic media, and by diazotising subsequently in known manner, for example, in aqueous medium and by coupling same with azocomponents of the formula (4)

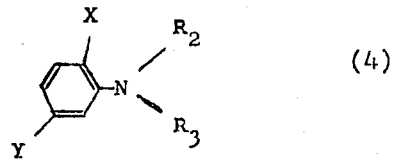

in which
X, Y, $R_2$ and $R_3$ are defined as above
The following Examples illustrate the invention:

EXAMPLE 1

7 parts by weight of the dyestuff having the formula

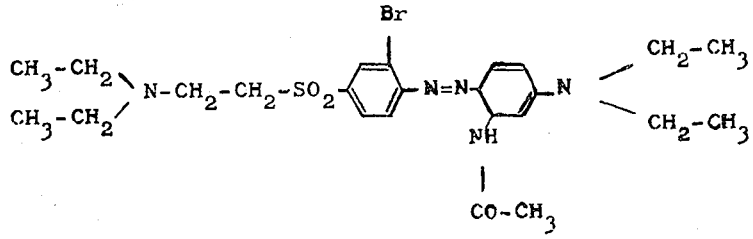

were dissolved in 1000 parts by volume of trichloroethylene at abt. 25°C. By means of a padding device having a squeeze effect of abt. 75% (weight of the padding liquor, calculated on the weight of the fabric) this liquor was applied to a woven fabric made of polyester fibres and, subsequently, dried in a suitable device by suctioning off the solvent vapors. The dyeing was subject to a Thermosol process at 210°C for one minute so as to fix the dyestuff.

Subsequently, the dyeing was washed cool in trichloroethylene for abt. 5 minutes. A fast reddish-orange dyeing was obtained.

The dyestuff may be prepared as follows:

26,2 g (0,2 mole) of 2-bromo-4-vinylsulfone-aniline were boiled for 10 hours under reflux in 100 ml of absolute ethanol with 7,3 g (0,1 mole) of diethylamine, thus entailing an almost 100% reaction to form 4-β-diethylamino-ethylsulfone-2-bromo aniline. 33.5 g (0,1 mole) of 4-β-diethylamino-ethylsulfone-2-bromo-aniline were dissolved in 100 ml of concentr. hydrochloric acid and 200 ml water. While cooling from the outside, a diazotising process was carried out with 17,5 g of sodium nitrite solution (at 40%) followed by 2 hours of stirring. 20,6 g (0,1 mole) of 3-diethyl-amino-acetanilide were dissolved in 250 ml of diluted hydrochloric acid and 500 ml of dimethylformamide. While cooling, coupling was performed by means of the afore mentioned diazosolution and, subsequently, sodium acetate acted as buffering agent. These reactions terminated, the reaction solution was adjusted from neutral to slightly alkaline, the dyestuff was precipitated completely by adding water, suctioning off, washing neutral and drying at 50°C in the vacuum drying oven.

EXAMPLE 2

3 parts by weight of the dyestuff having the formula

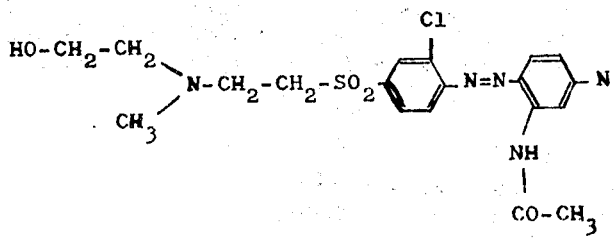

were dissolved at room temperature in 1000 parts by volume of methylene chloride. A woven fabric made of polyester fibers was padded with this dyestuff solution by means of a padding device having a squeeze effect of abt. 65%, subsequently dried and subject to a Thermosol process at 210°C for one minute.

Half of the dyeing was then rewashed cool in methylene chloride and the other half in perchlorethylene. In both cases a fast reddish-orange dyeing was obtained.

The dyestuff may be prepared as follows:

21,7 g (0,1 mole) of 2-chloro-4-vinylsulfone-aniline are put to reaction with 7,5 g (0,1 mole) of 2-methylaminoethanol, as described for example 1, to form 4-β-N-oxethyl-N-methylaminoethylsulfone-2-chloro-aniline.

The addition product was diazotised and coupled with 3-diethylamino-acetanilide according to the description given for example 1.

EXAMPLE 3

8 parts by weight of the dyestuff having the formula

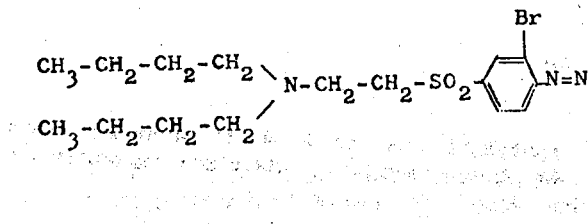

were dissolved in 1000 parts by volume of perchlorethylene at abt. 25°C.

A woven fabric made of polyester fibers was padded with this liquor by means of a padding device having a squeeze effect of 80%. Subsequently, the fabric was dried and subject to a Thermosol process at 220°C for 1 minute so as to fix the dyestuff. The dyeing was finished by rewashing same briefly in perchlorethylene at room temperature. A fast reddish-orange dyeing was obtained. Similar results may be produced by fixing the dyestuff by a steam treatment (30 minutes at 102°–103°C in steam or steaming for 10 minutes at 150°c in superheated perchlorethylene vapor), instead of the Thermosol - hot air - treatment.

The same fast orange-red colorations may be obtained by the same operation method applied to the following textile materials under the said modified Thermosol conditions:
woven fabrics made of polyamide 6 — fibers: for 1 minute at 185°C
woven fabrics made of polyamide 6,6-fibers: for 1 minute at 195°C
woven fabric made of 2 ½ acetate fibers: for 45 seconds at 165°C

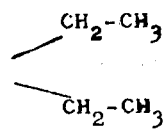

woven fabrics made of triacetate fibers : for 45 seconds at 175°C
Yarn made of polyvinylchloride fibers with a high degree of thermostability (type "thermovyl"): for 45 seconds at 130°C
Top made of polypropylene fibers : for 45 seconds at 145°C The dyestuff may be prepared as follows:
26,2 g (0,1 mole) of 2-bromo-4-vinyl-sulfone-aniline were put to reaction with 12,9 g (0,1 mole) of dibutylamine, as described for example 1, to form 4-β-dibutylamino-ethylsulfone-2-bromo-aniline.

The addition product diazotised and coupled with 3-diethylamino-acetanilide according to the description given for Example 1.

EXAMPLE 4

5 parts by weight of the dyestuff having the formula

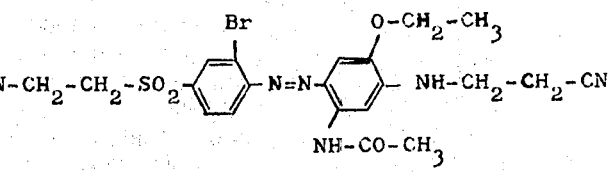

were dissolved at abt. 20°C in 1000 parts by volume of an azeotropic mixture of 50,5 % of 1,2,2-trifluorotrichloroethane and 49,5 % of methylene chloride at

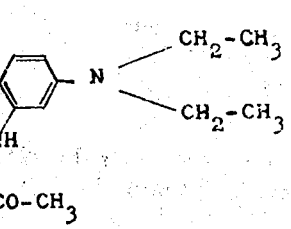

20°C. A woven fabric made of polyester fibers was impregnated with this dystuff solution by means of a padding device having a squeeze effect of abt. 70 % and, subsequently, dried. The dyestuff was fixed by a

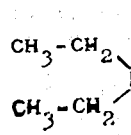

Thermosol treatment at 210°C for 1 minute. The result is a fast red dyeing.

The dyestuff may be prepared as follows:

24,6 g (0,1 mole) of 4-vinylsulfone-2-bromo-aniline are boiled under reflux flow for 10 hours in 100 ml of absolute ethanol with 12,9 g (0,1 mole) of dibutylamine, thus entailing an almost 100 % completed reaction to form 4-β-dibutylaminoethylsulfone-2-bromoaniline.

The addition product was diazotised and coupled with 2-ethoxy-5-acetamino-β-cyanetylaniline according to the description given for Example 1.

EXAMPLE 5

6 parts by weight of the dyestuff having the formula

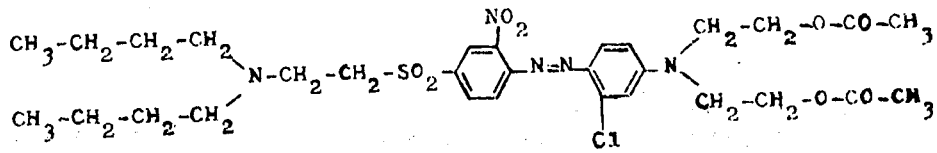

were dissolved at abt. 30°C in 1000 parts by volume of a mixture comprising 80 % by volume of perchlorethylene and 20 % by vol. of methanol. The further operation method corresponds to that described for Example 4. A fast red dyeing is obtained.

The dyestuff may be prepared as follows:

22,8 g (0,1 mole) of 4-vinylsulfone-2-nitroaniline are boiled for 10 hours under reflux in 100 ml of absolute ethanol with 12,9 g dibutylamine, thus entailing an almost 100 % completed reaction to form 4-β-dibutylamino-ethylsulfone-2-nitroaniline.

The addition product was diazotised and coupled with 3-dioxethylamino-chlorobenzene according to the description given for Example 1.

The isolated dyestuff having the formula

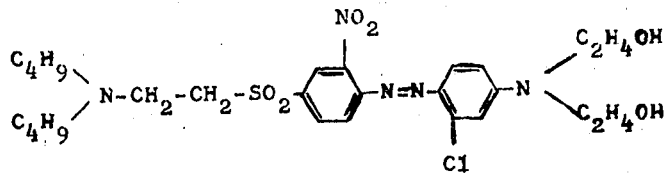

was acylated in methylethylketone with acetylchloride while adding pyridine as acid binding agent.

EXAMPLE 6

4 parts by weight of the dyestuff having the formula

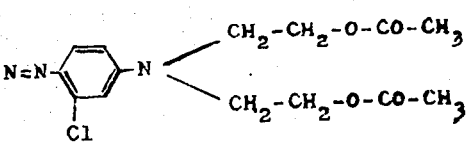

were dissolved in 1000 parts by volume of a mixture comprising 75 % by volume of 1,2,2-trifluorotrichloroethane and 25 % by vol. of methanol.

The further operation method corresponds to that described for Example 4. A fast orange coloration is obtained.

The dyestuff may be prepared as follows:

The diazocomponent was prepared according to the description given for Example 1 and diazotised. 0,1 mole of the diazotised 4-β-diethylamino-ethylsulfone-2-bromo-aniline were coupled in the usual manner with 29,9 g (0,1 mole) of 3-(diacetoxethyl)amino-chlorobenzene which were dissolved in 250 ml of diluted hydrochloric acid. The coupled mixture is restirred and neutralized. Subsequently, the dyestuff is suctioned off, washed neutral and dried at abt, 50°C in the vacuum dryeing oven.

EXAMPLE 7

4 parts by weight of the dyestuff having the formula

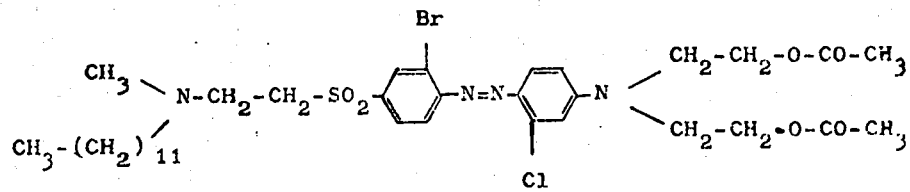

were dissolved in 1000 parts by volume of isopropanol, at abt. 25°C. A woven fabric made polyester fibers was padded with this padding liquor by means of a padding device having a squeeze effect of abt. 40 % and, subsequently, dried. The fabric was then subject to a Thermosol process at 210°C for 1 minute and, subsequently, treated cool for about 5 minutes in the same solvent which had been used before for padding. A fast orange dyeing was obtained.

The dyestuff may be prepared as follows:

The diazocomponent was obtained by addition of methyldodecyl-amino to 4-vinylsulfone-2-bromoaniline. After completion of the diazotising process coupling took place, as per the description for Example 6, with 3-(diacetoxy-ethyl) amino-chlorobenzene. The work-up was also performed as per Example 6.

EXAMPLE 8

8 parts by weight of the dyestuff having the formula

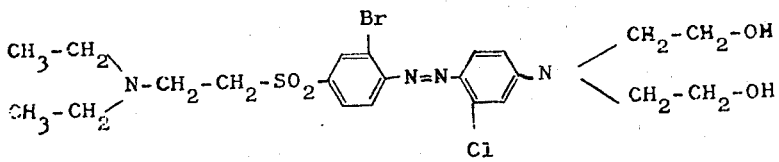

were dissolved at abt. 40°C in 1000 parts by volume of methanol. The further execution corresponded to that described for Example 7. A fast orange dyeing was obtained.

The dystuff may be prepared according to the description given for Example 6 and 3-(dioxethyl)amino-chlorobenzene acting as the azocomponent.

EXAMPLE 9

A result similar to that of Example 8 was obtained, by replacing the dyestuff solution indicated there with such a one comprising in 1000 parts by volume of ethanol 5 parts by weight of the dyestuff having the formula

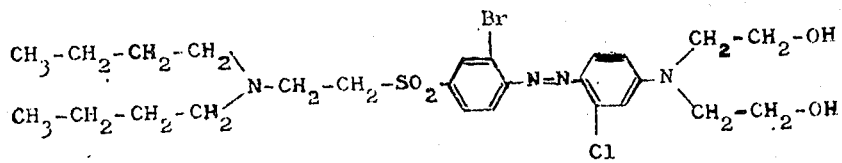

The dyestuff may be prepared according to the descriptions given for example 3 and 3-(dioxethyl)amino-chlorobenzene acting as azocomponent.

EXAMPLE 10

4 parts by weight of the dyestuff described in Example 2 and 4 parts by weight of the dyestuff described in Example 4 were dissolved at abt. 25°C in 1000 parts by volume of methanol. A woven fabric compriseing 67 % of polyester fibers and 33 % of cotton was padded with this liquor by means of a padding device, the squeeze effect of which was approximately 45 %. After having completed the impregnation, the woven fabric was dried, subject to a Thermosol treatment at 215°C for 1 minute and, subsequently, rewashed cold for abt. 10 minutes in methanol. The result was a fast reddish-orange dyeing on the polyester portion of the blended fabric.

EXAMPLE 11

8 parts by weight of the dyestuff having the formula

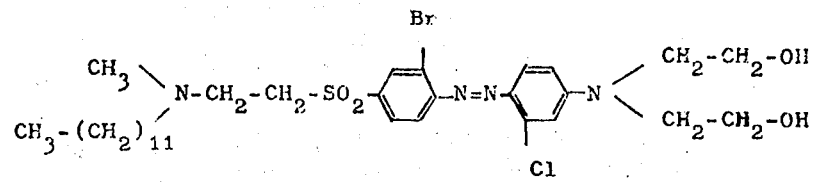

were dissolved at room temperature in 1000 parts by volume of 1,1,1-trichloroethane. A woven fabric made of polyester fibers was padded with this padding liquor by means of a padding device having a squeeze effect of abt. 65 %, subsequently dried and subject to a Thermosol process for 1 minute at 210°C. Half of the coloration was treated cold finally in methanol, the other half in perchlorethylene, each for abt. 5 minutes. In both cases the results were fast orange dyeing.

The dyestuff may be prepared as follows:

The diazocomponent was obtained by addition of methyl-dodecyl-amine to 4-vinylsulfone-2-bromo-aniline. After having completed the diazotising, coupling with 3-(dioxethyl)aminochlorobenzene took place as described for Example 6. The work-up was performed according to Example 6.

EXAMPLE 12

7 parts by weight of the dyestuff having the formula

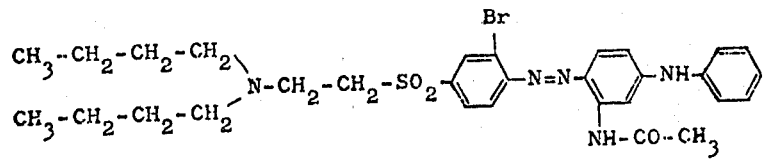

were dissolved at room temperature in 1000 parts by volume of methanol. A woven fabric made of polyester fibers was padded with this liquor as per the description given for Example 7 and subject to further treatment. A fast orange-red dyeing was obtained.

The dyestuff may be prepared according to Example 3 and 3-acetamino-diphenylamine acting as azocomponent.

EXAMPLE 13

8 parts by weight of the dyestuff having the formula

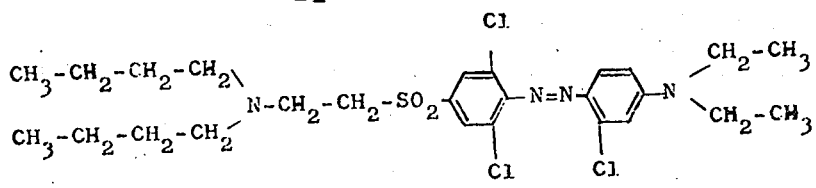

were dissolved at room temperature in 1000 parts by volume of perchlorethylene. A woven fabric made of polyester fibers was padded with this liquor by means of a padding device having a squeeze effect of abt. 80 %, subsequently dried and subject to a Thermosol process at 210°C for 1 minute. Finally the dyeing is re-washed cold for abt. 5 minutes in the same solvent. The result is a fast orange dyeing. A similar result was obtained by using the same quantity of methanol for replacing the perchlorethylene and by operating for the rest under the same conditions (squeeze effect abt. 40 %).

The dyestuff may be prepared as follows:

25,2 g (0,1 mole) of 2,6-dichloro-4-vinylsulfone-aniline were boiled under reflux for 10 hours in 150 ml of absolute ethanol with 12,9 g (0,1 mole) of dibutylamine, thus entailing an almost 100 % completed reaction to form 4-β-dibutylaminoethylsulfone-2,6-dichloroaniline. For the rest, the synthesis of the dyestuff was performed according to Example 1, 3-diethylamino-chlorobenzene acting as azocomponent.

The following table showed a series of dyestuffs which may be applied according to the afore mentioned examples to dye polyester fibers and which result in the colour shades specified:

| No. | Dyestuff | Colour shade on polyester fibers |
|-----|----------|----------------------------------|
| 1) | (C₄H₉)₂N-CH₂-CH₂-SO₂-C₆H₄-N=N-C₆H₃(Cl)-N(CH₂-CH₂-CN)(CH₂-CH₂-OCO-CH₃) | Yellow-orange |
| 2) | C₆H₁₃-NH-CH₂-CH₂-SO₂-C₆H₃(Cl)-N=N-C₆H₄-N(CH₂-CH₂-OCOCH₃)(CH₂-CH₂-CH₂-CH₃) | Orange |
| 3) | ((CH₃)₂CH(CH₂)₄)(CH₃)N-CH₂-CH₂-SO₂-C₆H₃(CH₃)-N=N-C₆H₃(CH₃)-N(CH₂-CH₂-CN)(CH₂-CH₂-OH) | Yellow |
| 4) | (C₄H₉)₂N-CH₂-CH₂-SO₂-C₆H₄-N=N-C₆H₄-N(C₂H₅)(CH₂-CH₂-OH) | Yellow |
| 5) | ((CH₃)₂CH(CH₂)₃)₂N-CH₂-CH₂-SO₂-C₆H₃(OCH₃)-N=N-C₆H₃(OCH₃)-N(C₂H₅)(CH₂-CH₂-OCOCH₃) | Yellow |
| 6) | ((CH₃)₂-CH₂-CH₂)₂N-CH₂-CH₂-SO₂-C₆H₃(NO₂)-N=N-C₆H₃(CH₃)-N(C₂H₅)(CH₂-CH₂-CO-O-CH₃) | Reddish-orange |
| 7) | (C₂H₅)₂N-CH₂-CH₂-SO₂-C₆H₃(SO₂CH₃)-N=N-C₆H₃(Cl)-N(CH₂-CH₂-OCO-CH₃)(CH₂-CH₂-C₆H₅) | Reddish-orange |
| 8) | (C₄H₉)₂N-CH₂-CH₂-SO₂-C₆H₃(NO₂)-N=N-C₆H₂(Cl)(NHCO-CH₃)-N(C₂H₅)(CH₂-CH₂-OCO-CH₃) | Violet |
| 9) | (H₃C)₂CH(CH₂)₃-NH-CH₂-CH₂-SO₂-C₆H₃(OCH₃)-N=N-C₆H₄-N(CH₃)(C₆H₅) | Orange |
| 10) | CH₃(CH₂)₁₁(CH₃)N-CH₂-CH₂-SO₂-C₆H₃(Cl)-N=N-C₆H₄-N(CH₂-CH₂-O-CH₃)₂ | Yellow-orange |

| No. | Dyestuff | Colour shades polyester fibers |
|---|---|---|
| 11) | (structure with $(C_2H_5)_2N-CH_2-CH_2-SO_2-$ (2,6-diCl phenyl) $-N=N-$ (2-Br phenyl) $-N(CH_2-CH_2-CN)(CH_2-CH_2-OH)$) | Orange |
| 12) | (structure with $(C_4H_9)_2N-CH_2-CH_2-SO_2-$ (phenyl with $SO_2CH_3$) $-N=N-$ (2-Cl phenyl) $-N(C_2H_5)(CH_2-CH_2-OCO-O-CH_3)$) | Reddish-orange |
| 13) | (structure with $((CH_3)_2CH-CH_2)_2N-CH_2CH_2-SO_2-$ (2,6-dimethyl phenyl) $-N=N-$ (phenyl with NHCO-CH$_3$) $-N(C_2H_5CN)(C_2H_4-OCO-CH_3)$) | Orange |
| 14) | (structure with $CH_3-CH_2-COO-(CH_2)_2N(CH_3)-CH_2-CH_2-SO_2-$ (2-Br phenyl) $-N=N-$ (phenyl with OCH$_3$ and NHCOCH$_3$) $-N(C_2H_5)_2$) | Red |
| 15) | (structure with $CH_3(CH_3(CH_2)_4)N-CH_2-CH_2-SO_2-$ (2-NO$_2$ phenyl) $-N=N-$ (phenyl with OC$_2$H$_5$ and NHCOCH$_3$) $-N(C_2H_5)_2$) | Violet |
| 16) | (structure with $(CH_3-(CH_2)_2)_2N-CH_2-CH_2-SO_2-$ (2-OCH$_3$ phenyl) $-N=N-$ phenyl $-N(C_6H_5)(CH_2CH_2-OH)$) | Yellow-orange |
| 17) | (structure with $(C_4H_9)_2N-CH_2-CH_2-SO_2-$ (2-Cl,5-Br phenyl) $-N=N-$ (2-Cl phenyl) $-N(CH_2-CH_2-C_6H_5)(CH_2-CH_2-OH)$) | Orange |
| 18) | (structure with $(C_4H_9)_2N-CH_2-CH_2-SO_2-$ (2-CH$_3$ phenyl) $-N=N-$ phenyl $-N(CH_2-CH_2-OCOCH_3)_2$) | Yellow |
| 19) | (structure with $(C_4H_9)_2N-CH_2-CH_2-SO_2-$ (2-NO$_2$ phenyl) $-N=N-$ phenyl $-N(CH_2CH_2COOCH_3)_2$) | Yellowish red |
| 20) | (structure with $C_4H_9-O-CH_2-CH_2-N(CH_3)-CH_2-CH_2-SO_2-$ (phenyl with $SO_2CH_3$) $-N=N-$ (phenyl with NHCOCH$_3$) $-N(C_2H_5)_2$) | Purple |
| 21) | (structure with $(CH_3)_2CH(CH_2)_3NH-CH_2-CH_2-SO_2-$ (2,6-diCl phenyl) $-N=N-$ (2-Cl phenyl) $-N(CH_2-CH_2-CN)(C_2H_5)$) | Orange |
| 22) | (structure with 2-OCH$_3$, 5-SO$_2$CH$_2$-CH$_2$-N(C$_4$H$_9$)$_2$ phenyl $-N=N-$ phenyl $-N(CH_2-CH_2-OCO-CH_3)_2$) | Yellow |

| No. | Dyestuff | Colour shades polyester fibers |
|---|---|---|
| 23) | 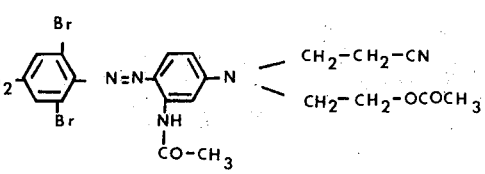 | Brown |
| 24) | 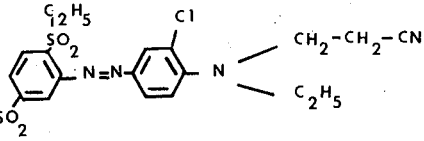 | Reddish-yellow |
| 25) | 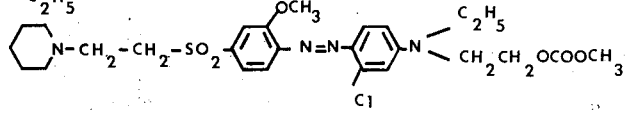 | Orange |

We claim:

1. A process for the continuous dyeing of synthetic fibrous materials from organic solvents, which comprises impregnating the said fibrous materials with organic dyebaths containing at least one dyestuff of the formula (1)

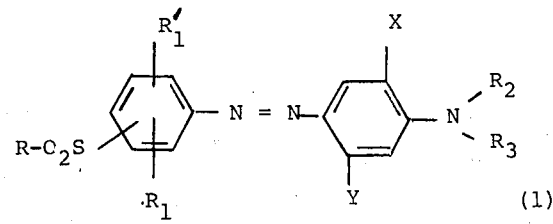

in which R represents a secondary or tertiary amino group of the formula (2)

in which $R_4$, $R_5$ each represents straight chain or branched alkyl, hydroxyalkyl, lower alkyl -COO- lower alkylene, lower alkyl -o- lower alkylene, and $R_4$ additionally represents hydrogen, or $R_4$ and $R_5$ represent together with the nitrogen atom the heterocyclic ring

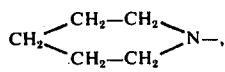

$R_1$ and $R_1'$ each represents hydrogen chlorine, bromine, lower alkyl, lower alkoxy, nitro or $-SO_2-$ lower alkyl, $R_2$ and $R_3$ each represents hydrogen, lower alkyl, cyano-lower alkylene, hydroxylower alkylene, lower alkylene

lower alkylene

lower alkyl, lower alkylene-phenyl or phenyl, X represents hydrogen, chlorine, bromine, lower alkyl or lower alkoxy, Y represents hydrogen, chlorine, bromine, lower alkyl, lower alkoxy or acylamino, and subsequently fixing the applied dyestuffs by a heat treatment.

2. A process as claimed in claim 1, wherein the dyebath contains a halogenated hydrocarbon as organic solvent.

3. A process as claimed in claim 1, wherein the dyebath contains an aliphatic alcohol as organic solvent.

4. A process as claimed in claim 1, wherein the dyebath contains mixtures of halogenated hydrocarbons, mixtures of aliphatic alcohols or mixtures of halogenated hydrocarbons and aliphatic alcohols.

5. A process as claimed in claim 1, wherein the dyeings are after-treated with an organic solvent.

6. A process as claimed in claim 1, wherein the dyeings are after-treated with an organic solvent which had been used in the dyebath for the dyeing process.

7. A process as claimed in claim 1, wherein textile materials consisting of or containing polyamides, polyolefines, polyacrylo-nitriles, polyurethanes, polyvinylchloride, polyvinyl acetate, cellulose-2½-acetate, cellulose-triacetate or polyesters are dyed.

* * * * *